United States Patent [19]

Lewis

[11] Patent Number: 5,782,502
[45] Date of Patent: Jul. 21, 1998

[54] RADIAL-RELEASE QUICK CONNECTOR

[75] Inventor: J. Gordon Lewis, Bloomfield Hills, Mich.

[73] Assignee: ITT Automotive, Inc., Auburn Hills, Mich.

[21] Appl. No.: 581,102

[22] Filed: Dec. 29, 1995

[51] Int. Cl.[6] ............................................. F16L 55/00
[52] U.S. Cl. ........................... 285/87; 285/305; 29/428
[58] Field of Search .......................... 285/87, 305, 81, 285/82, 91, 320; 29/428

[56] References Cited

U.S. PATENT DOCUMENTS

| | | | |
|---|---|---|---|
| 1,298,878 | 4/1919 | Brown | 285/305 X |
| 1,893,979 | 1/1933 | Barrere | 285/320 X |
| 2,423,726 | 7/1947 | Prata | 285/91 |
| 4,423,892 | 1/1984 | Bartholomew | 285/319 |
| 4,433,861 | 2/1984 | Kreczik | 285/305 |
| 4,650,221 | 3/1987 | Caillouet | 285/320 X |
| 4,787,770 | 11/1988 | Lewis | 285/82 X |
| 4,792,163 | 12/1988 | Kulle | 285/82 X |
| 4,913,467 | 4/1990 | Washizu | 285/39 |
| 5,016,922 | 5/1991 | Le Mer et al. | 285/81 |
| 5,069,424 | 12/1991 | Dennany, Jr. et al. | 251/149.6 |
| 5,102,313 | 4/1992 | Szabo | 417/572 |
| 5,152,555 | 10/1992 | Szabo | 285/93 |
| 5,354,102 | 10/1994 | Carman | 285/81 |
| 5,360,237 | 11/1994 | Carman et al. | 285/81 |
| 5,401,063 | 3/1995 | Plosz | 285/81 |

FOREIGN PATENT DOCUMENTS

| | | | |
|---|---|---|---|
| 488844 | 6/1992 | European Pat. Off. | 285/305 |
| 1513350 | 1/1968 | France | 285/81 |
| 3739745 | 11/1988 | Germany | 285/320 |
| 1317226 | 6/1987 | U.S.S.R. | 285/305 |
| 1404747 | 6/1988 | U.S.S.R. | 285/305 |

*Primary Examiner*—Dave W. Arola
*Attorney, Agent, or Firm*—Thomas N. Twomey; J. Gordon Lewis

[57] ABSTRACT

A quick connector assembly includes a female component having an axial bore adapted to sealingly receive a first end of a mating tube, wherein the female component further includes a transverse slot intersecting the axial bore adapted to receive and retain a U-shaped retainer, first, in a partially-inserted "shipping" position wherein the legs of the retainer engage complementary surfaces on opposite sides of the slot to releasably secure the retainer therein while otherwise permitting axial passage of an upset bead on the tube's first end into the axial bore past the retainer's legs and, second, in a fully-inserted position wherein inner surfaces on the retainer's legs resiliently engage the periphery of the tube while axially-disposed surfaces on the retainer's legs and bight oppose axial displacement of the tube's upset bead to lock the tube in the female component. One leg of the retainer extends to define a flap which is pivoted into interlocking engagement with the retainer's other leg, whereby a surface of the flap is likewise placed in axial opposition with the tube's upset bead to further lock the tube in the female component.

26 Claims, 4 Drawing Sheets

5,782,502

RADIAL-RELEASE QUICK CONNECTOR

TECHNICAL FIELD

The invention relates generally to fluid conduit connector assemblies which include a male connector component, a female connector component having a first bore adapted to sealingly receive the male component, and a retainer or locking element insertable into the female component and engageable with the thus-received male component for releasably locking the male component therein. More specifically, the invention relates to connector assemblies featuring radially-displaceable retainers or locking elements, i.e., retainers which are inserted within a transverse bore or slot formed in the female component so as to axially engage an external flange on the male component and, hence, secure the male component within the female component's first bore.

BACKGROUND OF THE INVENTION

Known connector assemblies featuring retainers or locking elements for securing a male connector component, such as a tubular conduit, within a complementary bore of a female connector component employ retainers which are either axially- or radially-displaceable relative to the female component's axial bore. Advantages of axially-displaceable retainers (also known as "I.D." or axially-releasable retainers) generally include roughly symmetrical engagement of the conduit's upset bead, thereby avoiding creation of a bending moment upon axial loading of the connector assembly; such symmetrical engagement of the upset bead often approaches 360 degrees of engagement; packaging is often streamlined; and such axially-displaceable retainers may be combined with a second, redundant (and, often, radially-displaceable) retainer to prevent decoupling in high pull-off-force applications.

As one might expect, major disadvantages of axially-displaceable retainers include the practical limitations as to pull-off force in the absence of a redundant radial-release retainer, a critical limitation in applications such as vehicle fuel lines; the packaging difficulties typically encountered when combining two axially-displaceable retainers, or an axially-displaceable retainer with a radially-displaceable retainer; the typical requirement of a specialty tool in order to effect retainer release; and the limitations on application of such retainers attendant such specialty tool use. Moreover, known radially-displaceable retainers typically require the conduit to move axially relative to the female component during installation of the retainer and, often, during its release. This requirement for simultaneous axial displacement of both retainer and conduit further serves to limit the number of applications in which such retainers may be used.

As for radially-displaceable retainers (also known as "O.D." or "radially-releasable" retainers), advantages include much greater resistance to axial pull-off forces; greater ease of release where radial access is available, as compared to axially-displaceable retainers; release may often be effected without the need for specialty tools; and packaging is often improved due to the fact that such radially-displaceable retainers are displaced during installation to a position wholly internal to the female component. Perhaps most significantly, the end of the conduit may be fully seated within the axial bore of the female component prior to full radial displacement of the retainer, whereupon the conduit will remain fully seated until such time as the retainer is removed from its complementary transverse slot in the female component. Stated another way, no relative axial movement of the conduit relative to the female component is required, either for installation or release of typical radially-displaceable retainers.

Unfortunately, known radially-displaceable retainers are difficult to integrate with one another, effectively preventing use of redundant radially-displaceable retainers; and known radially-displaceable retainers tend to engage but a portion of the conduit's upset bead, whereupon a bending moment may be generated which may compromise the quality of the resulting coupling.

Thus, what is needed is a connector assembly which incorporates the advantages of both types of prior art retainers and, particularly, the generally symmetrical loading of the male tube end form typically achieved with known axial release retainers and the increased resistance to axial pulloff forces typically achieved with known radial-release retainers.

SUMMARY OF THE INVENTION

Under the present invention, a connector assembly includes a male connector component, such as a tubular conduit, having a external flange or upset bead formed thereon proximate to its mating end, and a female connector component having a radially-stepped bore formed therein along a first axis adapted to receive the mating end of the conduit such that, upon insertion of the male component into the axial bore, the conduit's upset bead is seated against a radial shoulder within the axial bore. The female component further includes a transverse slot intersecting the axial bore and extending through the female component so as to expose a longitudinal section of the conduit immediately adjacent its upset bead when the conduit is seated within the axial bore. A sealing means, such as a pair of O-rings disposed within circumferentially-extending grooves inside the axial bore, engages the mating end of the conduit upon its insertion into the bore to provide a fluid-tight seal therebetween.

The connector assembly further comprises retainer means, such as a U-shaped retainer, adapted to be received in the slot such that a leg on the retainer passes on either side of the exposed section of thus-seated conduit. When fully inserted into the slot to a first engaged position, a first "locking" surface on each leg of the retainer is placed in axial opposition and, preferably, axial engagement with the conduit's upset bead, thereby interlockingly engaging the conduit with the female component's axial bore.

In accordance with the present invention, in a second fully-latched position, the retainer means is further transversely displaceable with respect to the female component's axial bore so as to effect redundant interlocking engagement of the conduit therein. Thus, in a preferred embodiment, one of the retainer's legs extends to define a flap portion separated by a hinge portion, with the flap portion being resiliently pivotable at the hinge portion about a second axis towards and, ultimately, into interlocking engagement with the retainer's other leg, as through the use of opposed catches on the free end of the flap portion and the other leg, respectively. The flap portion includes a second "locking" surface adapted to axially oppose and, preferably, axially engage the upset bead on the fully-inserted conduit when the flap portion is pivoted into interlocking engagement with the other leg.

Still further, the intermediate section or "bight" of the retainer is preferably provided with a third "locking" surface which is placed in axial opposition with the conduit's upset bead upon full insertion of the retainer into the female component's transverse slot. Thus, upon fully inserting the retainer into the slot and thereafter pivoting its flap portion of one leg into interlocking engagement with its other leg, the respective locking surfaces on the retainer's legs, flap portion and bight provide for substantially symmetrical axial engagement of the conduit's upset bead.

In accordance with another feature of the present invention, each of the retainer's legs preferably resiliently engages an opposite side of the exposed section of the conduit as the retainer is fully inserted into the slot, thereby serving to lock the retainer within the slot of the female component. The retainer preferably also includes a retention barb on the outside of each leg which interlockingly engages with complementary surfaces on the female component, first, when the retainer is partially inserted into the slot to a "shipping" position characterized in that the retainer is thus releasably secured within the slot while otherwise permitting the axial insertion of the conduit's mating end and, particularly, its upset bead past the axially-disposed locking surfaces on the retainer's legs; and, second, when the retainer is fully inserted into the slot.

In accordance with yet another feature of the present invention, the bight portion and flap portion of the retainer are adapted to resiliently engage the exposed section of the conduit upon interlocking engagement of the flap portion with the other leg, as through slight flexing of the retainer's flap portion, thereby ensuring active interlocking engagement of the opposed catches on the free end of the flap portion and the other leg, respectively, even in the presence of severe vibration. Such resilient engagement of the bight portion and flap portion of the retainer further serves to minimize rattle of the thus-assembled connector.

From the foregoing, it will be appreciated that the connector assembly of the present invention features increased resistance of pull-off while otherwise achieving a substantially symmetrical loading of the conduit's upset bead to further reduce the likelihood of a connector failure, even in the presence of severe vibration. As a further benefit, proper selection of retainer dimensions will avoid an increase in the envelope of the connector assembly while the retainer's locking flap itself serves to "seal" the slot of the connector body and, hence, improve the reliability of the resulting connection.

BRIEF DESCRIPTION OF THE DRAWINGS

Referring to the drawings, wherein like reference numerals are used to designate like elements in each of the several figures.

DETAILED DESCRIPTION OF THE PREFERRED EMBODIMENTS

Figure 1:
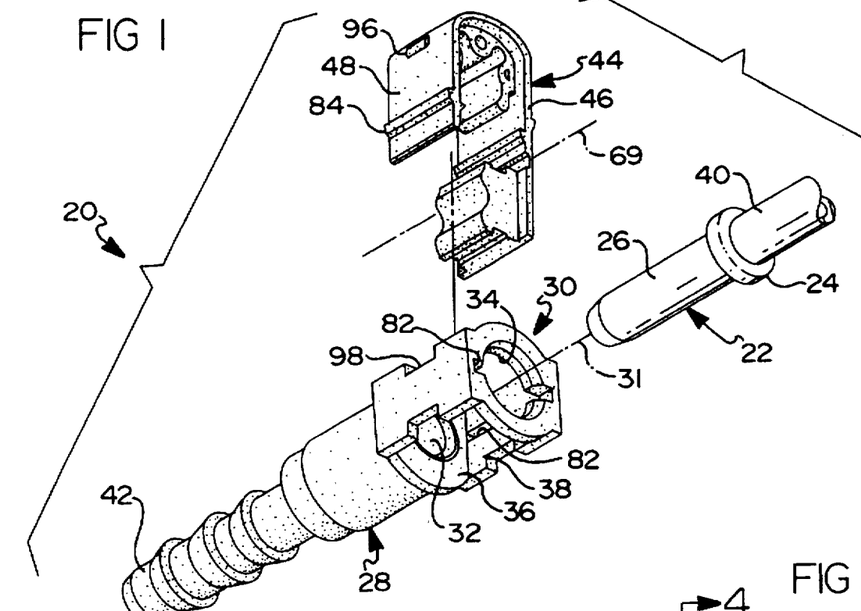
FIG. 1 is an exploded assembly view in perspective of a quick connector assembly in accordance with the present invention incorporating a first preferred radially-displaceable retainer.

Referring to FIG. 1, an exemplary quick connector assembly 20 in accordance with the present invention includes as its male component a thin-wall tube 22 formed of metal, plastic or other suitable material. The tube 22 itself is provided with an upset bead 24 formed proximate to its mating end 26. As its female component, the connector assembly 20 includes a tubular connector body 28 having a stepped-radius bore 30 extending longitudinally therethrough along a first axis 31. The connector body's axial bore 30 is itself adapted to receive both the tube's mating end 26 and upset bead 24 in an intermediate-diameter portion 32 and a large-diameter portion 34, respectively, such that, upon full insertion of the tube 22 into the axial bore 30, the upset bead 24 seats itself against a radial shoulder 36 defined within the bore 30 at the interface between the intermediate-diameter portion 32 and the large-diameter portion 34.

The connector body 28 also has a transverse slot 38 defined therein which intersects the bore's large-diameter portion 34 proximate to radial shoulder 36 so as to expose a longitudinal section 40 of the thus-received tube 22 adjacent to its upset bead 24, in a manner to be discussed more fully below. By way of example only, the opposite end 42 of the connector body 28 is provided with axially-spaced circumferential retaining flanges adapted to receive and retain a hose (not shown) thereabout.

The quick connector assembly 20 further includes a generally U-shaped retainer 44 adapted to be received in the tubular body's transverse slot 38 such that the retainer's legs 46,48 will pass along either side of the exposed section 40 of the previously-seated tube 22 as the retainer 44 is inserted leg-first into the slot 38. More specifically, and referring to the enlarged perspective view of the retainer 44 illustrated in FIG. 2, the legs 46,48 of the retainer 44 extend in a first direction from opposite sides of the retainer's intermediate bridging portion or bight 50.

Figure 2:
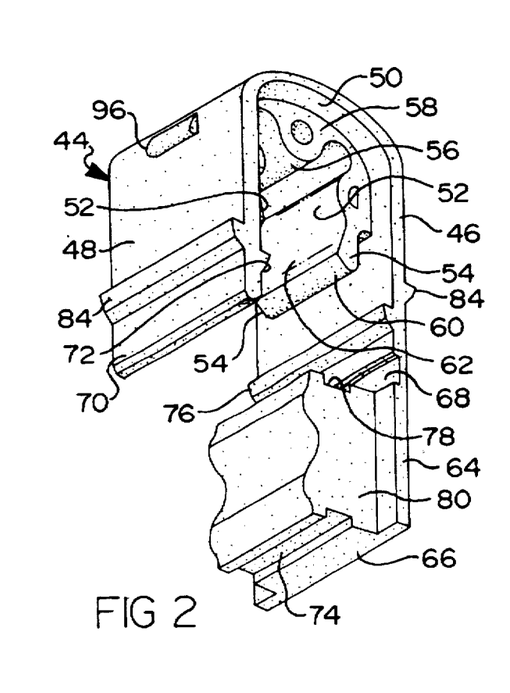
FIG. 2 is an enlarged view in perspective of the first preferred retainer.

Each leg 46,48 includes an inner projection 52 which defines a "locking" surface 54 adapted to axially oppose and, preferably, axially engage the tube's upset bead 24 when the retainer 44 is fully inserted into the slot 38. In this manner, the locking surface 54 on each retainer leg 46,48 serves to prevent axial displacement of the tube's upset bead 24 within the connector body's axial bore 30 beyond a predetermined point, thereby locking the tube 22 therein. An inner projection 56 on the retainer's bight 50 likewise extends to define a locking surface 58 which is placed in axial opposition and, again, preferably in axial engagement with the tube's upset bead 24 upon full insertion of the retainer 44 into the slot 38.

In accordance with another feature of the present invention, a cantilevered portion 60 of the inner projection 52 on each leg 46,48 defines a radially-disposed, resilientlyyieldable surface 62 thereon which faces the other leg. As will be seen in FIGS. 5 and 7, these opposed radial surfaces 62 interferingly engage the exposed longitudinal section 40 of the tube 22 upon full insertion of the retainer 44 into the slot 38 thereby locking the retainer 44 within the connector body 28.

Returning to FIG. 2, one of the retainer's legs 46 extends to define a "locking flap 64" at its free end 66. The retainer's locking flap 64 is preferably separated from the rest of the leg 46 by a "living hinge 68" or similar bridging member of reduced thickness. In this manner, the locking flap 64 is advantageously integrally formed with the retainer 44. It will be appreciated, however, that the present invention contemplates the use of a separately formed, e.g., separately molded, flap member which is thereafter hingedly interconnected with one of the retainer's legs 46 so as to pivot about a second axis 69 generally parallel to the first axis 31, either through use of integrally-formed hinge or a separate joining element.

The locking flap 64 is permitted to pivot at the living hinge 68 about second axis 69 towards and, ultimately, into interlocking engagement with the free end 70 of the retainer's other leg 48, the latter being accomplished in first retainer 44 by means of interlocking engagement of a ramped locking projection 72 on the inside of leg 48 with a complementary slot 74 formed in the locking flap 64 adjacent its leg's free end 66.

In order to prevent loss of the locking flap 64 in the event of a structural failure of living hinge 68, a ramped locking projection 76 is also provided on the inside of leg 46 which likewise interlockingly engages a complementary slot 78 in the locking flap 64 immediately adjacent to hinge 68.

In accordance with the present invention, when the locking flap 64 is pivoted about axis 69 into interlocking engagement with the retainer's other leg 48 (as well as with its own leg 46 as described in the previous paragraph), a surface 80 on the locking flap 64 is brought into axial opposition with and, preferably, axially engages the upset bead 24 of the tube 22 seated within the connector body's axial bore 30. The locking flap 64 thus axially engages the tube's upset bead 24 along a circumferential portion thereof diametrically opposite to the circumferential portion axially engaged by locking surface 58 on the retainer's bight 50. When added to the circumferential portions of the upset bead 24 axially engaged by the locking surface 54 on each leg 46,48, it will be appreciated that the quick connector assembly 20 provides for substantially symmetrical axial engagement of the tube's upset bead 24 while eliminating creation of deleterious bending moments which might cause leaking or structural failure of the resulting connection.

Referring again to FIGS. 1 and 2, the slot 38 in the connector body 28 is shown as including a pair of centralized, axially-extending grooves 82 while the first retainer 44 includes a catch means, such as a ramped external projection or retention barb 84, extending outwardly on each leg 46,48. The slot's longitudinal grooves 82 cooperate with the retainer's retention barbs 84 to releasably secure the retainer 44 in a partially-inserted, "pre-assembly" or "shipping" position within the slot 38.

Figure 3:
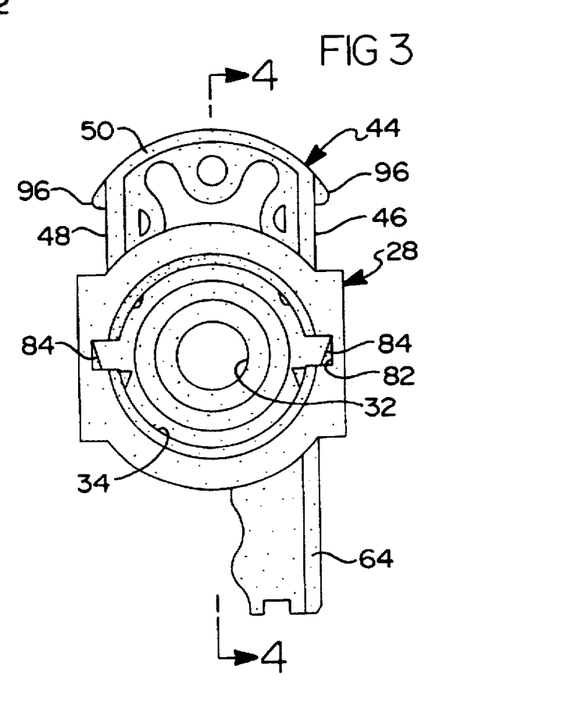
FIG. 3 is an end view of the quick connector assembly upon partial insertion of the first preferred retainer into the transverse slot in the female component.

In this manner, the retainer 44 can be retained within the slot 38 while otherwise permitting axial passage of the tube's upset bead 24 into the bore 30 past the very same locking surfaces 54, 58 on the retainer's legs 46,48 and bight 50 that will later prevent axial displacement of the tube's upset bead 24 upon full insertion of retainer 44 into slot 38. An end view of the connector body 28 with the first retainer 44 partially inserted to the shipping position is illustrated in FIG. 3, while a longitudinal view in cross section showing the retainer 44 partially inserted into the connector body's transverse slot 38 is found in FIG. 4. It is noted that the retainer's locking flap 64 may project out from the other end of the slot 38 when the retainer 44 is releasably secured by retention barbs 84 and grooves 82 within the connector body 28, as shown in FIGS. 3 and 4.

Figure 4:
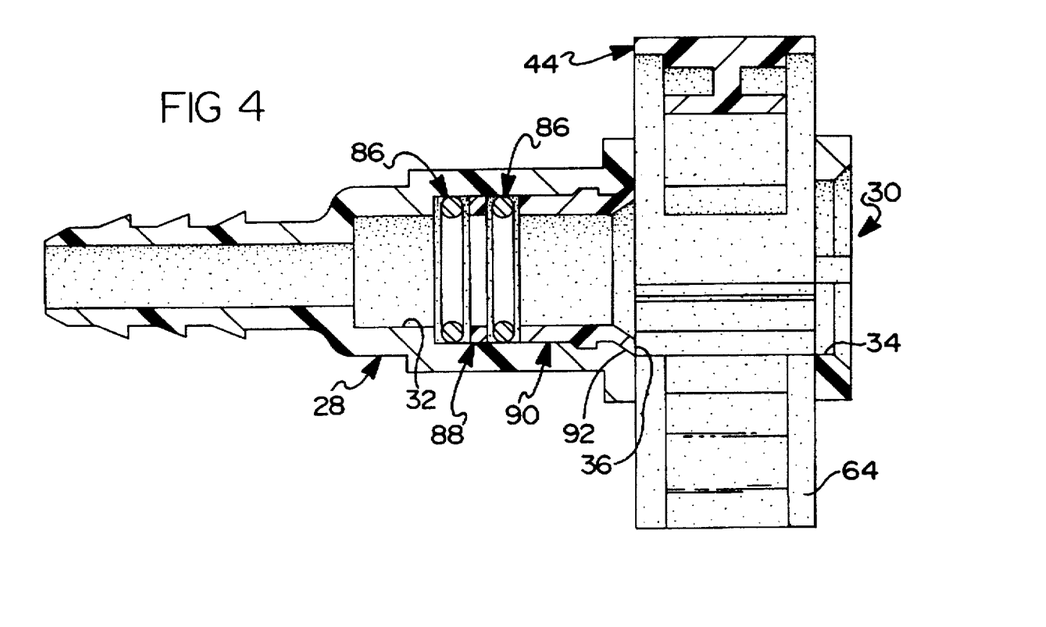
FIG. 4 is a cross-sectional view of the quick connector assembly along line 4—4 of FIG. 3.

FIG. 4 further illustrates an exemplary sealing means within the connector body's axial bore 30 as including a pair of O-rings 86 separated by an annular bushing 88 and secured within a counterbored portion of the bore's intermediatediameter portion 32 by a top-hat bushing 90. The top-hat bushing 90 also provides the bore's intermediate-diameter portion 32 with a chamfered leading edge with which to guide the tube's mating end 26 thereinto, with the top-hat bushing's enlarged annular portion 92 cooperating with adjacent radiallyextending portions of bore 30 to define the radial shoulder 36 against which the tube's upset bead 24 is seated upon insertion of the tube's mating end 26 into bore 30. Upon inserting the tube 22 into bore 30, the O-rings 86 radially engage the outer surface of the tube's mating end 26 to provide a fluid-tight seal between the tube 22 and the connector body 28.

Figure 5:
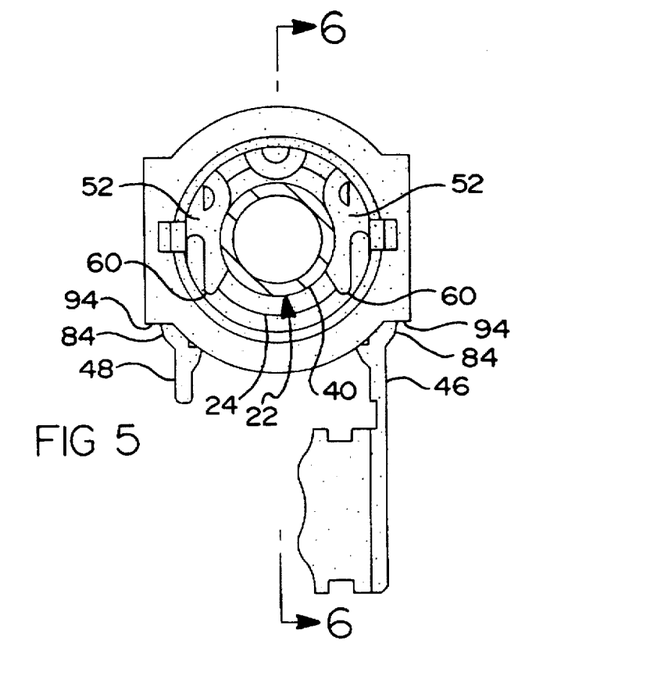
FIG. 5 is an end view of the quick connector assembly upon full insertion of both the conduit and, subsequently, the first preferred retainer into the female component, but prior to pivoting the flap portion of one of the retainer's legs into engagement with its other leg.
Figures 6, 7:
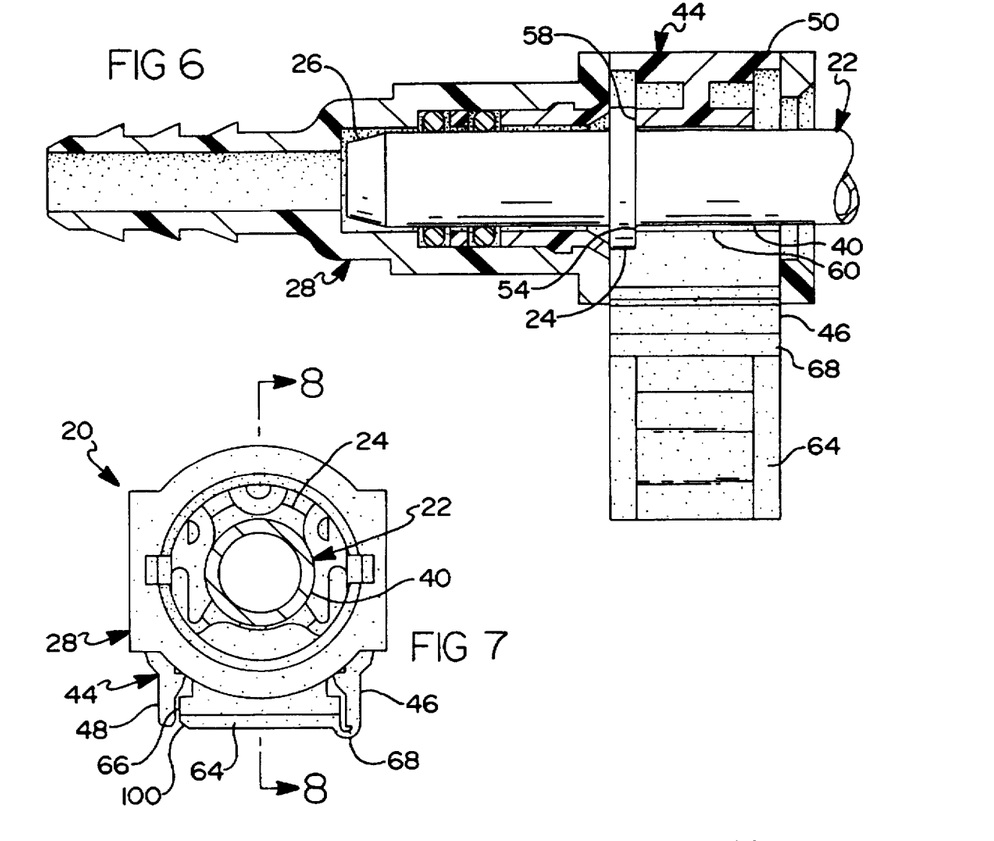
FIG. 6 is a cross-sectional view of the quick connector assembly along line 6—6 of FIG. 5.
FIG. 7 is an end view of the quick connector assembly with the conduit fully inserted and locked therein using the first preferred retainer.

Referring now to FIGS. 5 and 6, the quick connector assembly 20 is shown with the tube 22 fully seated within bore 30 and with the first retainer 44 fully inserted into slot 38. The retainer's legs 46,48 now straddle the exposed section 40 of the tube 22 adjacent its upset bead 24, with the locking surfaces 54,58 on the retainer's legs 46,48 and bight 50 now in axially opposition/engagement with the tube's upset bead 24. As such, the tube 22 is now locked within the connector body's axial bore 30, while the retainer 44 is locked in the slot 38 through resilient radial engagement of the cantilevered portions 60 of inner projections 52 on legs 46,48 with the exposed section 40 of tube 22.

To further ensure that the retainer 44 is securely locked in slot 38 in its fully-inserted position, FIG. 5 further shows the engagement of external retention barbs 84 with complementary external locking surfaces 94 on the connector body 28 adjacent the "bottom" of the slot 38. Meanwhile, as best seen in FIGS. 1–3, a tab 96 projecting from each of the retainer's legs 46,48 proximate to its bight 50 engages a complementary notch 98 formed in the connector body 28 adjacent the "top" of the slot 38 to further secure the retainer 44 therein. In this regard, it is noted that the connector body 28 is provided with redundant, symmetrical locking surfaces 94 and notches 98 to permit insertion of the retainer 44 into either end of the slot 38. The retainer 44 is likewise provided with axially-disposed surfaces at both axial "ends" to permit insertion of the retainer 44 into slot 38 either "right-side-up" or "right-side-down." Meanwhile, the "slip-fit" engagement of retainer 44 and slot 38, which serves to orient and guide retainer 44 within a plane normal to the axis 31 of bore 30 as it is inserted into slot 38, ensures that the axis 69 about which the retainer's locking flap 64 is ultimately pivoted remains substantially parallel to the bore's axis 31.

Figure 8:
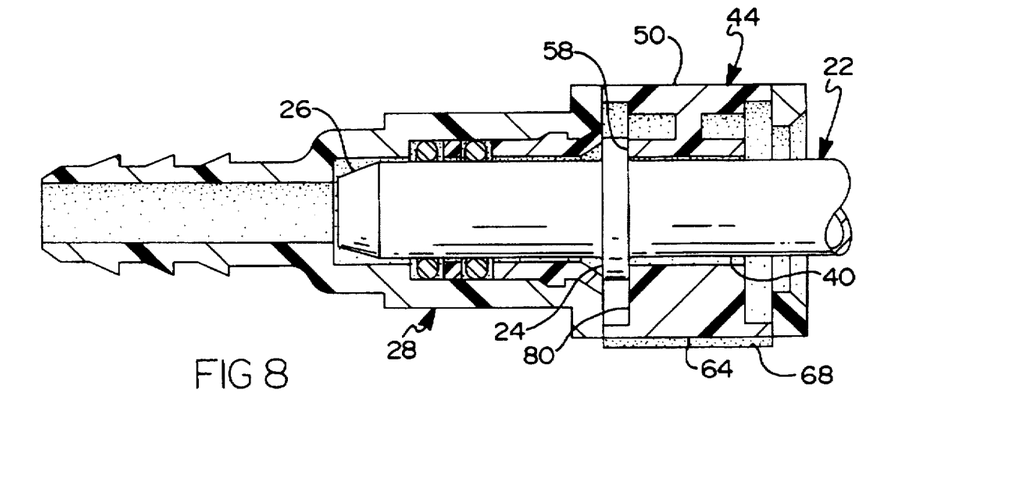
FIG. 8 is a cross-sectional view of the quick connector assembly along line 6—6 of FIG. 5.

FIGS. 7 and 8 show the quick connector assembly 20 with the retainer's locking flap 64 on leg 46 fully pivoted into interlocking engagement with leg 48, thereby bringing the axially-disposed surface 80 on the flap 64 into axial opposition/engagement with upset bead 24. Both the tube 22 and the retainer 44 are now fully locked within the connector body 28, with the retainer's bight 50 and locking flap 64 further serving to "seal" the top and bottom of slot 38. A thin, resilient flashing (not shown) may further be molded into the retainer 44 on one or more of its edges thereby to further "seal" slot 38 and, hence, prevent entry of dirt and other contaminants thereinto. An annular dust cap (not shown) may serve to further close-off bore 30 subsequent to insertion of tube 22 thereinto, whereby the connector assembly 20 is fully protected against dirt and other contaminants.

In accordance with another feature of the present invention, the first retainer 44 described in connection with FIGS. 1–8 is removable from slot 38 thereby to permit removal of tube 22 from within bore 30. More specifically, the retainer's locking flap 64 may be pivoted away from leg 48 upon disengagement of locking projection 72 and complementary groove 74, as through insertion of a suitable tool such as a flat-blade screw driver (not shown) between the free end 66 of locking flap 64 and the inside of leg 48. The insertion of such a tool between locking flap 64 and leg 48 is facilitated by a chamfer 100 formed on the outer edge of the locking flap's free end 66, as best seen in FIG. 7.

Similarly, a notch (not shown) may be formed in the outer edge of the locking flap's free end 66 to thereby define a slot adapted to receive the end of a suitable tool once the flap 64 is interlockingly engaged with leg 48. Alternatively, leg 48 may be extended so as to project slightly farther from the connector body 28 than the outer surface of locking flap 64, thereby providing a lever arm, the outward movement of which will effect or otherwise facilitate disengagement of locking flap 64 and leg 48.

It is further noted that the legs 46,48, hinge 68 and locking flap 64 of the first retainer 44 described in FIGS. 1–8 are slightly enlarged in the several views in the interest of clarity. It will be appreciated, however, that the dimensions of the first retainer 44 may preferably be adjusted so as to minimize the portions thereof which extend beyond the confines of the connector body 28 once the retainer 44 is fully inserted and locked therein. In this manner, the envelope of the resulting connector assembly 20 can be advantageously reduced roughly to that of the connector body 28 itself.

Figures 9, 10:
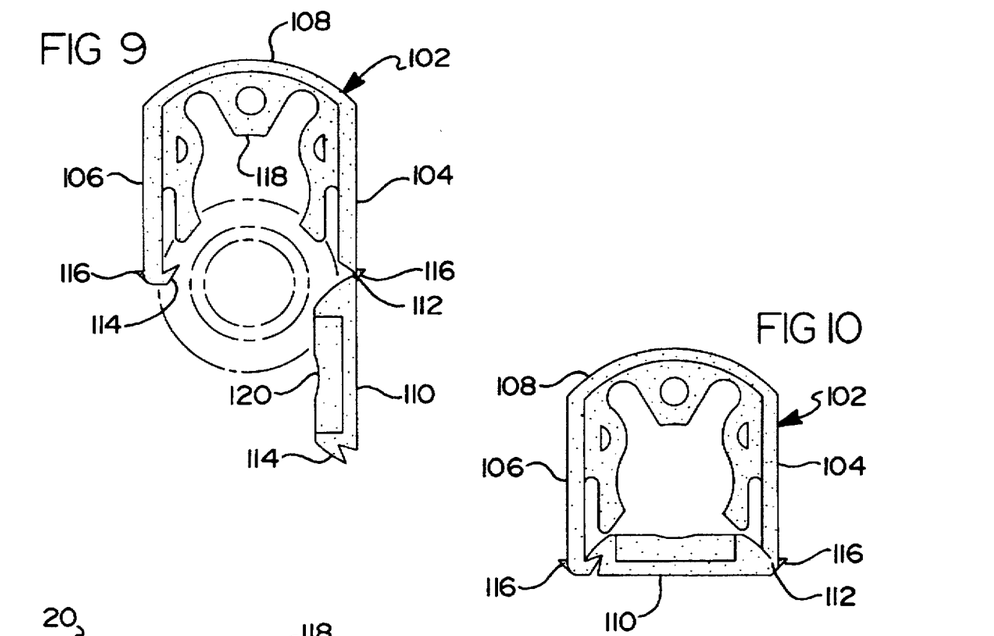
FIG. 9 is an end view of a second preferred retainer for use with the present quick connector assembly prior to insertion of the second preferred retainer into the female component's transverse slot.
FIG. 10 is an end view of the second preferred retainer of FIG. 9 illustrating its locking flap pivoted into interlocking engagement with its other leg.

A second preferred retainer 102 for use with the quick connector assembly 20 of the present invention is shown in end view in FIGS. 9 and 10. As with the first retainer 44, the second retainer 102 includes a pair of legs 104,106 extending from a bight 108, with one leg 104 extending to define a locking flap 110 separated by a "hinge 112" of reduced thickness. As shown in FIG. 10, locking flap 110 is likewise pivotable about hinge 112 into interlocking engagement with leg 106 as through engagement of complementary catch means on the flap 110 and leg 106, respectively, such as opposed undercut, axially-extending barbs 114. As in the first retainer 44, the second retainer 102 includes external ramped locking projections 116 on its legs 104,106 to provide for the retainer's partially-inserted "shipping" position through engagement with the slots' complementary grooves 82.

Figure 11:
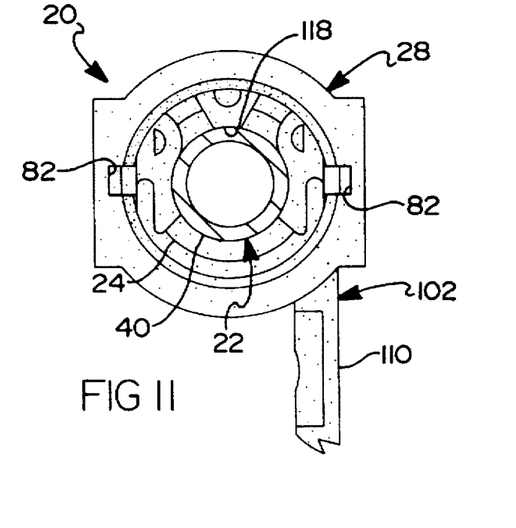
FIG. 11 is an end view of the quick connector assembly upon full insertion of both the conduit and, subsequently, the second preferred retainer into the female component's axial bore and transverse slot, respectively, but prior to pivoting the retainer's flap portion toward its other leg.
Figure 12:
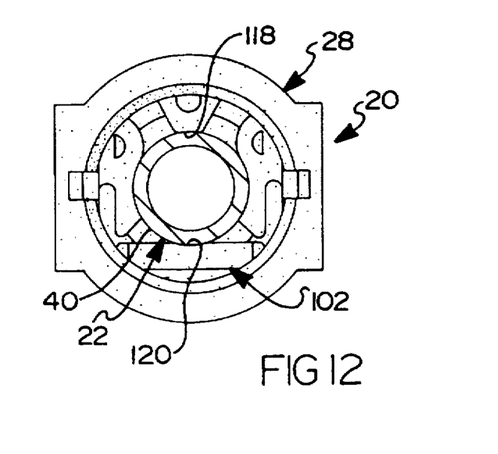
FIG. 12 is an end view of the quick connector assembly with the conduit fully inserted and locked therein using the second preferred retainer.

The second retainer 102 likewise includes axially disposed surfaces on the opposed legs 104,106, bight 108 and locking flap 110, respectively, with which to lock the mating tube 22 within the connector body's axial bore 30. In contrast to the first retainer 44, however, the second retainer's bight 108 and locking flap 110 further include radially disposed surfaces 118,120 which resiliently radially engage the exposed section 40 of the tube 22 upon pivoting and resiliently bending flap 110 into interlocking engagement with leg 106, as seen in FIGS. 11 and 12. Such resilient radial engagement of surfaces 118,120 with the tube 22 serves to maximize engagement of undercut barbs 114 while causing the retainer 102 to "hug" the tube 22, thereby further serving to prevent rattling of the second retainer 102 within the connector body's transverse slot 38. Such resilient radial engagement of surfaces 118,120 with tube 22 further cooperate with undercut barbs 114 to advantageously provide a substantially "permanent," i.e., difficult to release, coupling of tube 22 and connector body 28.

While the preferred embodiments of the invention have been disclosed, it should be appreciated that the invention is susceptible of modification without departing from the spirit of the invention or the scope of the subjoined claims. For example, while the alternate disclosed embodiments employ retainers 44,102 which are hingedly interconnected with their locking flaps 64,110, the present invention contemplates use of a discrete, second retainer which is transversely displaceable with respect to component body 28 thereby to effect redundant interlocking engagement of tube 22 and component body 28.

I claim:

1. A connector assembly comprising:

a male component having an external flange proximate to a first end thereof;

a female component having receiving member defined therein along a first axis receiving the first end of said male component, the receiving member including a radial shoulder selectively engaged by the external flange of said male component upon insertion of said male component into the receiving member thereby limiting axial travel of said male component thereinto, said female component further including a slot extending transversely through said female component so as to intersect the first bore proximate to the radial shoulder thereof; and a retainer received within the slot of said female component, said retainer having a pair of legs separated by a bight portion, wherein a first surface on each leg axially opposes the external flange on said male component thereby preventing removal of said male component from the receiving member of said female component, said retainer further including a locking member being displaceable about the legs into interlocking engagement with the legs, the interlocking engagement being between an engagement feature of the legs and an engagement feature of the locking member, the locking member having a second surface thereon substantially co-planar with the first surface which axially opposes the external flange on said male component when the locking member is interlockingly engaged with the legs.

2. The connector assembly of claim 1, wherein a third surface on each leg of said retainer resiliently radially engages a first longitudinal section of said male component when said retainer is fully inserted into the receiving member of said female component.

3. The connector assembly of claim 1, wherein the legs of the retainer include a pair of opposed resiliently-yieldable projections adapted to interferingly radially engage with said male component upon insertion of said retainer into the slot in said female component.

4. The connector assembly of claim 1, wherein a fifth surface on the bight portion of said retainer axially opposes the external flange on said male component upon insertion of said retainer into the slot in said female element.

5. The connector assembly of claim 1, wherein a sixth surface on the bight portion of said retainer resiliently radially engages said male component when said retainer is inserted within the slot in said female component.

6. The connector assembly of claim 1, including means on at least one of the group consisting of said female component and said retainer for releasably securing said retainer in a first position within the slot in said female component, said first position being characterized in that the external flange on said male component is insertable into the receiving member first bore of said female component past the legs of said retainer.

7. The connector assembly of claim 6, wherein said means for releasably securing said retainer in said first position within the slot of said female component includes a catch means on an outer surface of at least one of the legs, said catch means engaging a complementary groove on the female component when said retainer is inserted into the slot to said first position therein.

8. The connector assembly of claim 1, wherein said locking member includes a flap portion on an end of one leg separated by a hinge portion, the flap portion being pivotable about the hinge portion into interlocking engagement with the other leg.

9. The connector assembly of claim 8, wherein a fourth surface on the flap portion of said retainer resiliently radially engages said male component when the flap portion is interlockingly engaged with the other leg.

10. A retainer for locking a male component of a connector assembly within a female component of the connector assembly, wherein the male component includes an external flange proximate to an end thereof, and wherein the female component includes a receiving member defined therein sized to receive the first end of the male component such that a radial shoulder in the receiving member axially engages the external flange of the male component upon full insertion of the male component into the receiving member, the female component further including a transverse slot intersecting the receiving member proximate to the radial shoulder thereof so as to expose a longitudinal section of the male component when the male component is fully inserted into the receiving member, said retainer comprising:

a body including two legs extending in a first direction from opposite sides of an intermediate bight portion, wherein each leg includes a first surface normal to a direction of insertion of the male member and axially opposing the external flange on the male component upon full insertion of the retainer into the slot thereby resisting removal of the male component from the first bore, and a locking member being displaceable about the legs, the locking member including a third surface substantially co-planar with the first surface adapted to axially oppose the external flange on the fully-inserted male component when the locking member is displaced into interlocking engagement with the legs, the interlocking engagement being between an engagement feature of the legs and an engagement feature of the locking member.

11. The retainer of claim 10, wherein the bight portion of said retainer includes a fifth surface adapted to radially engage the exposed section of the male component upon full insertion of said retainer into the slot.

12. The retainer of claim 10, wherein the legs of said retainer have opposed resiliently-yieldable projections thereon adapted to radially engage the exposed section of the male component upon full insertion of said retainer into the slot.

13. The retainer of claim 10, wherein said locking member includes a flap portion defined by an extension of one leg separated by a hinge portion, the flap portion being pivotable about the hinge portion into interlocking engagement with the other leg.

14. The retainer of claim 13, wherein the flap portion of said retainer includes a fourth surface adapted to radially engage the exposed section of the male component upon pivoting the flap portion thereof into interlocking engagement with the other leg.

15. A method for coupling a first end of a male connector component with a complementary receiving member formed in a female connector component, wherein the male component includes an external flange and the receiving member in the female component includes a radial shoulder, and wherein the female component further includes a slot extending transversely therethrough so as to intersect the receiving member proximate to the radial shoulder thereof, said method comprising the steps of:

providing a retainer including a pair of legs separated by a generally transversely-extending bight portion, wherein the retainer is placed in the slot of the female component and the retainer is selectively moveable between a partially inserted position and a fully inserted position and the legs of the retainer extend across the receiving member on opposite sides of the male component when in the partially inserted position and the male component is inserted into the receiving member, and a locking member displaceable into locking engagement with the legs when the retainer is in a fully inserted position;

positioning the retainer in the partially inserted position in the slot of the female component:

after said retainer positioning step, inserting the first end of the male component into the receiving member such that the external flange of the male component is seated against the radial shoulder of the receiving member;

after said male component-inserting step, displacing the retainer into the fully inserted position in the slot such that a surface of each leg of the retainer axially opposes the external flange on the male component thereby resisting removal of the male component from the first bore; and after said full-retainer-inserting step, displacing the locking member of the retainer into interlocking engagement with the retainer's legs, the interlocking engagement being between an engagement feature of the legs and an engagement feature of the locking member, whereupon a surface of the locking member co-planar with the surfaces of the leg axially opposes the external flange on the male component thereby further resisting removal of the male component from the receiving member.

16. The method of claim 15, wherein said locking member includes a flap portion defined by an extension of one leg separated by a hinge portion, the flap portion being resiliently pivotable about the hinge portion into interlocking engagement with the other leg, and wherein said displacing the locking member step includes pivoting the flap portion on one leg into interlocking engagement with the retainer's other leg.

17. A connector assembly comprising:

a connector body configured to axially mate with a male member and having a first surface selectively engaged by an upset of the male member;

a primary retainer selectively transversely displaceable with respect to the body between a release position and an engaged position for interlocking said body and said male member together and having a second surface axially spaced from the first surface and the first and second surfaces together effecting the interlocking between said body and said male member; and a secondary retainer displaceable about the primary retainer from an unlatched position to a latched position when said primary retainer is in said engaged position effecting redundant interlocking of said body and said male member, with a third surface substantially co-planar with the second surface.

18. The connector assembly of claim 17, wherein said primary and secondary retainers are integrally formed.

19. The connector assembly of claim 17, wherein said primary and secondary retainers and hingedly interconnected.

20. The connector assembly of claim 17, wherein said secondary retainer is operative to lock said primary retainer in said engaged position when said secondary retainer is in said latched position.

21. A connector assembly comprising:

a connector body configured to axially mate with a male member; and retainer means transversely displaceable with respect to the body including a means for providing a release position to receive the male member, a means for providing an engaged position to interlock said body and said male member, and a means for providing a fully-latched position to effect redundant interlocking engagement of said body and male member.

22. The connector assembly of claim 21, wherein said retainer means is substantially enclosed within said body when in said fully latched position.

23. A connector assembly comprising:

a connector body configured to mate with a male member along a first axis, said body including a transverse slot intersecting said first axis; and retainer means configured to be received in the slot and displaceable therein between an engaged position for interlocking said body and said male member, and a fully-latched position for effecting redundant interlocking engagement of said body and male member wherein said retainer means includes a primary retainer, and a secondary retainer hingedly interconnected with said primary retainer so as to pivot about a second axis, said second axis being substantially parallel to said fist axis said retainer means is received in the slot of said body.

24. The connector assembly of claim 23, wherein the primary and secondary retainers are integrally formed.

25. The connector assembly of claim 23, wherein, in said fully-latched position, the secondary retainer locks the primary retainer within the slot of said body.

26. The connector assembly of claim 25, wherein, in the fully-latched position, the secondary retainer resiliently transversely engages said male member.

\* \* \* \* \*